US006356405B1

(12) United States Patent
Gui et al.

(10) Patent No.: US 6,356,405 B1
(45) Date of Patent: Mar. 12, 2002

(54) LUBRICANT CONTROL IN DISC DRIVE

(75) Inventors: Jing Gui, Fremont; Bruno J. Marchon, Palo-Alto, both of CA (US); Zine-Eddine Boutaghou, Vadnais Heights; David G. Wobbe, Shakopee, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/201,549

(22) Filed: Nov. 30, 1998

Related U.S. Application Data

(60) Provisional application No. 60/086,482, filed on May 22, 1998.

(51) Int. Cl.[7] ................................................ G11B 21/04

(52) U.S. Cl. ............................................ 360/70; 360/75

(58) Field of Search ................................ 360/75, 234.1, 360/69, 75 L, 70, 128

(56) References Cited

U.S. PATENT DOCUMENTS

| | | | | |
|---|---|---|---|---|
| 4,692,832 A | | 9/1987 | Bandara et al. | 360/137 |
| 4,893,205 A | | 1/1990 | Hoppe et al. | 360/104 |
| 4,912,583 A | | 3/1990 | Hinlein | 360/104 |
| 5,331,487 A | | 7/1994 | Gregory et al. | 360/97.02 |
| 5,352,947 A | | 10/1994 | MacLeod | 310/67 |
| 5,396,383 A | | 3/1995 | Gregory et al. | 360/97.02 |
| 5,541,789 A | | 7/1996 | Fukuoka et al. | 360/103 |
| 5,559,650 A | | 9/1996 | Repphun et al. | 360/97.02 |
| 5,615,368 A | * | 3/1997 | Terashima et al. | 360/75 X |
| 5,631,081 A | | 5/1997 | Lin et al. | 428/332 |
| 5,798,884 A | * | 8/1998 | Gillis et al. | 360/75 |
| 5,850,321 A | * | 12/1998 | McNeil et al. | 360/106 |
| 6,002,549 A | * | 12/1999 | Berman et al. | 360/104 |
| 6,084,743 A | * | 7/2000 | Comstock et al. | 360/128 X |

FOREIGN PATENT DOCUMENTS

| | | | | |
|---|---|---|---|---|
| JP | 405054347 | * | 3/1993 | 360/75 L |

* cited by examiner

*Primary Examiner*—David Hudspeth
*Assistant Examiner*—K. Wong
(74) *Attorney, Agent, or Firm*—Westman, Champlin & Kelly, P.A.

(57) ABSTRACT

In a disc drive with a disc spun by a motor and a head positionable over the disc, a disc drive controller alternately leaves the head landed on successive landing spots in a landing zone on the disc for selected stop intervals to remove an increment of lubricant from the head with each stop and then automatically lifts the head by spinning the disc for selected run intervals between the stop intervals so the head does not stick to the disc.

20 Claims, 8 Drawing Sheets

LUBRICANT CONTROL IN DISC DRIVE

The present invention claims priority to Provisional Application Ser. No. 60/086,482, filed May 22, 1998 and entitled DRIVE-LEVEL ALGORITHM TO REDUCE LUBE COLLECTION ON HEADS.

BACKGROUND OF THE INVENTION

Magnetic disc drives for the storage of digital information in computerized systems are known. In such disc drives, a read/write head flies above the surface of spinning disc having magnetic media at its surface. The head is positionable to read and write information on concentric tracks on the disc. Typically the disc and head will have multiple layers to provide a compact arrangement, and the disc drives are sealed and have lubricant distributed over the media surfaces over which the head flies.

As the disc drive is exercised in ordinary use, the lubricant accumulates undesirably on head surfaces over time. The lubricant can migrate from air bearing stagnation regions between the head and the disc to air bearing surface regions of the head by capillary action. The process of migration is complex and depends on many factors such as lubricant viscosity and surface tension, the peak roughness of the disc surface, the length of the slider, temperature, as well as the presence of humidity and other contaminants.

When the disc drive is not in use for some time, the heads are landed in a landing zone and the spinning of the disc is stopped. When there is a large enough accumulation of lubricant on the head, the lubricant can flow back into the narrowed interface between the head and the disc, resulting a high static friction, or stiction between the head and the disc. If the disc drive motor does not have sufficient torque to overcome the stiction, the discs will become stuck, making repair or replacement of the disc drive necessary.

There is a need for disc drive technology which reduces the stiction to a small enough level so that the disc does not become stuck due to lubricant accumulation after periods of normal exercise or use.

SUMMARY OF THE INVENTION

In a disc drive with a disc spun by a motor and a head positionable over the disc, a disc drive controller alternately lands the head on the disc for a selected stop interval to remove an increment of lubricant from the head then automatically lifts the head by spinning the disc a run interval after the stop interval so the head does not stick to the disc.

DETAILED DESCRIPTION OF THE PREFERRED EMBODIMENTS

Figure 1:
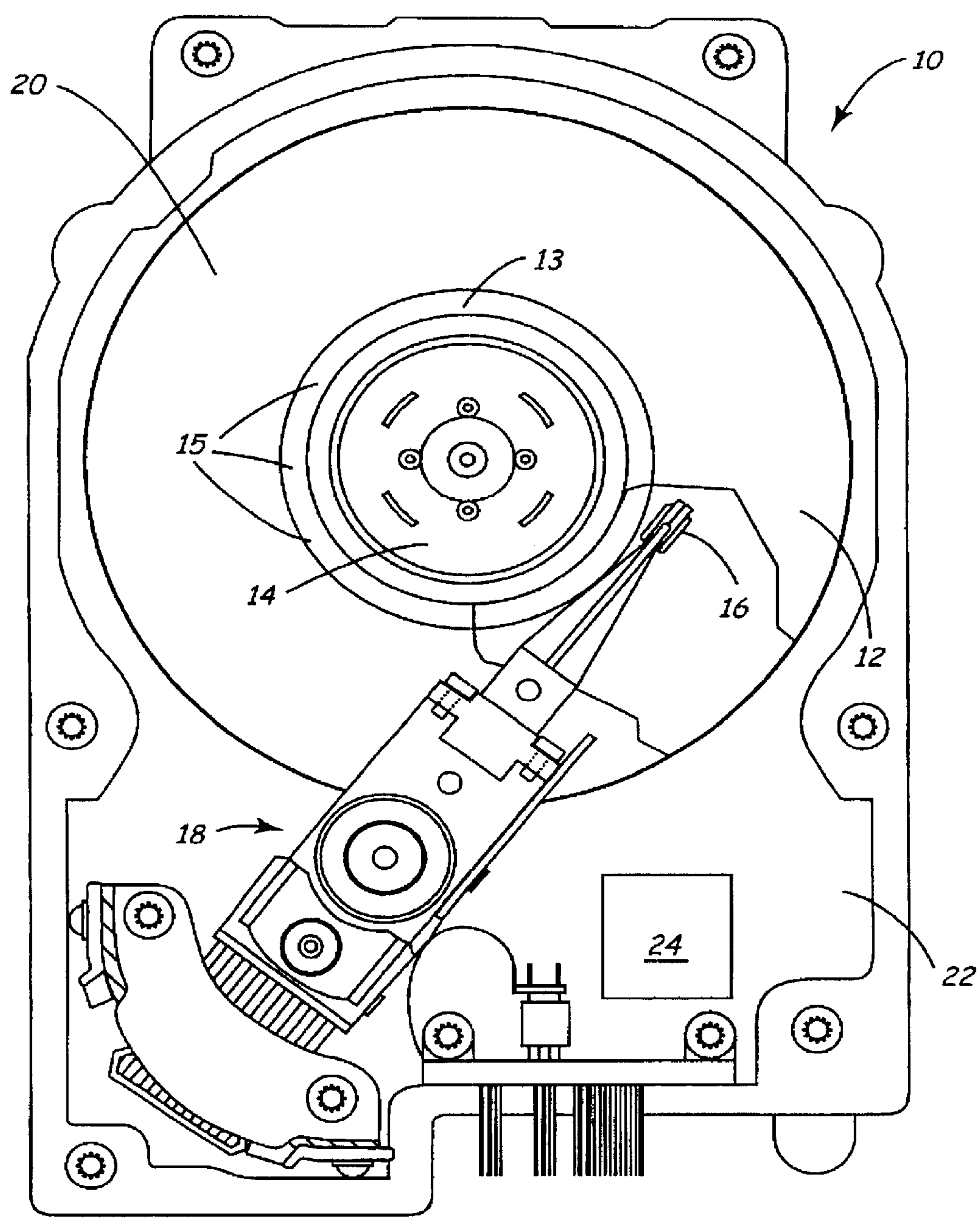
FIG. 1 is a top view of a disc drive incorporating the present invention, with its upper casing removed.

In FIG. 1, disc drive 10, shown with its upper casing removed, includes a multiple layer disc 12 coupled to disc drive motor 14 which spins disc 12. A read/write head 16 which has multiple heads interleaved with the multiple disc layers is shown connected to head positioner 18. Lubricant 20 is distributed over the surfaces of disc 12. Disc 12 includes landing zone 13 with multiple spots or locations 15 for landing head 16 when the disc drive 10 is not in active use. Disc drive motor 14 and head positioner 18 are controlled by controller 22 which includes electronic circuitry 24 which executes an algorithm preventing excess accumulation of lubricant 20 on read/write head 16.

Figure 2:
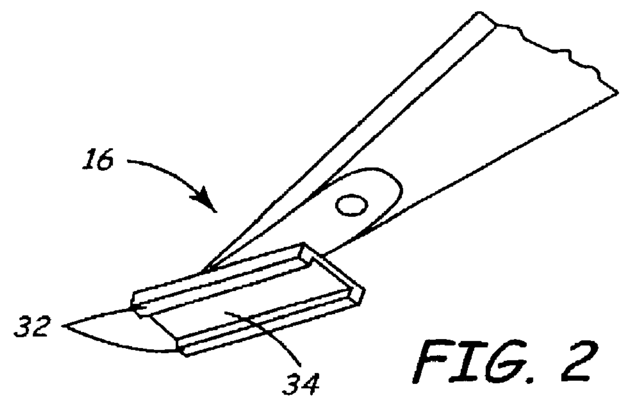
FIG. 2 is a partial perspective view of a head for a disc drive.

In FIG. 2, read/write slider or head 16 is partially shown to includes shaped surfaces 32 on either side of magnetic transducer surface 34. When disc 12 is spinning, shaped surfaces 32 fly over the lubricated surfaces of disc 12. The relative motion between the disc surface and the shaped surfaces 32 creates an air bearing which permits the head to fly over the disc surface rather than remaining in contact with it. The air bearing, however, includes a stagnation region that can allow the transfer of excessive amounts of lubricant 20 to head 16, where lubricant 20 accumulates undesirably. Without the use of the present invention, the head could become flooded with accumulated lubricant. When head 16 is landed one of the landing spots 15 and left there for a period of time, the accumulated lubricant could flow slowly back into the gap between the head and disc and eventually cause head 16 and disc 12 to stick together.

The static friction, also called stiction, between the surfaces can be so high that drive motor 14 does not have enough torque to overcome the stiction and the drive becomes stuck. Such sticking does not take place, however, because drive controller 22 includes circuit 24 which executes a lubrication algorithm described below.

Figure 3:
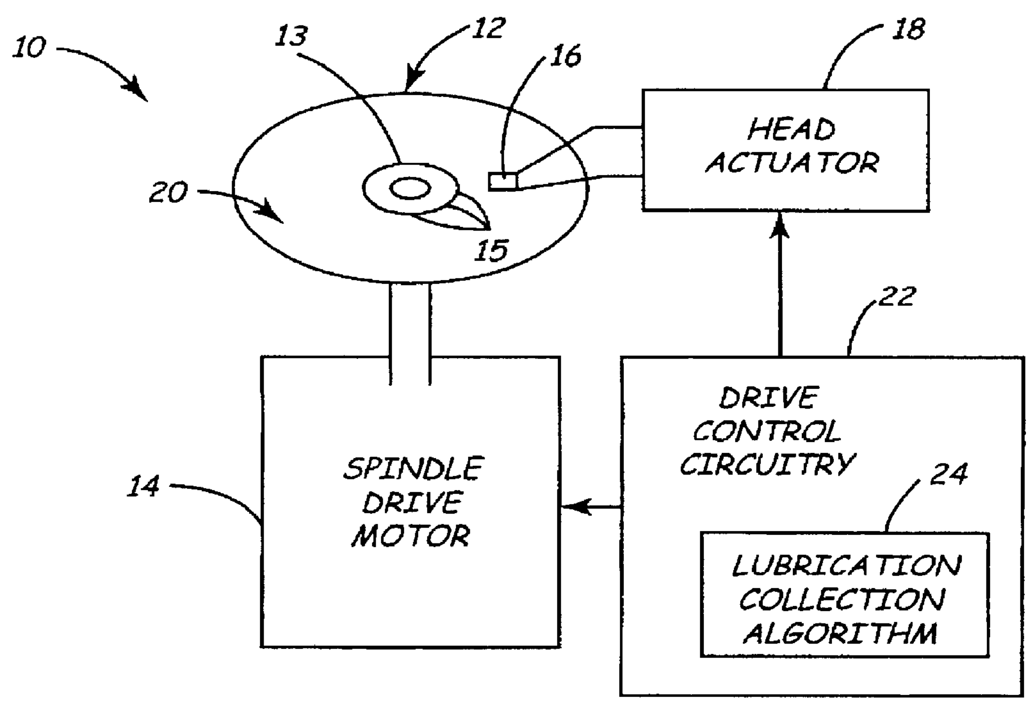
FIG. 3 is a block diagram showing coupling of disc controller circuitry.

In FIG. 3, the arrangement of disc drive 10 of FIG. 1 is shown schematically.

Figure 4:
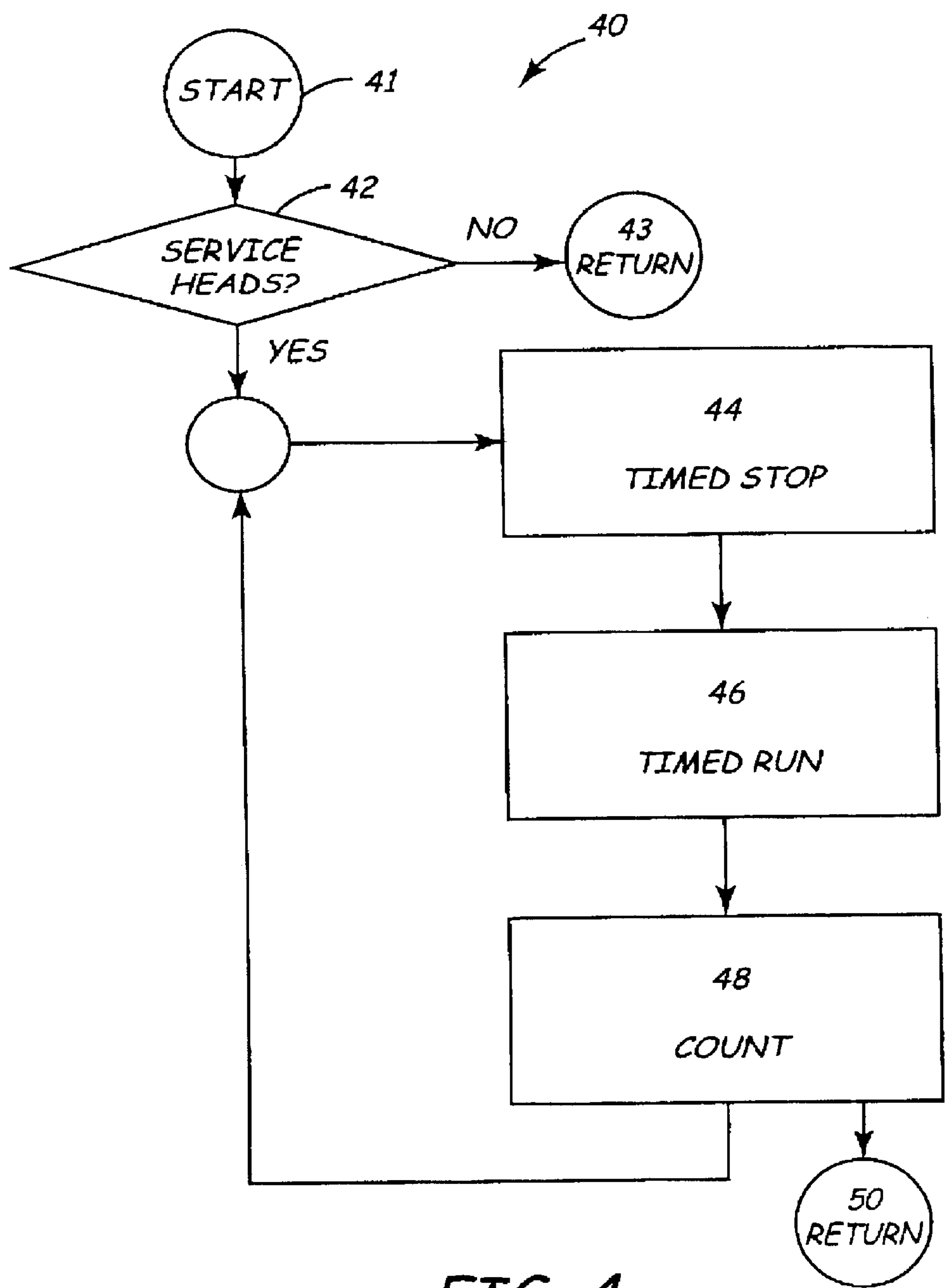
FIG. 4 is a flow chart of a process of removing lubricant from a head.

In FIG. 4, a method or process 40 (typically performed by controller 22) of incrementally removing lubricant accumulated on the head of a disc drive is shown as a flow chart. Program flow starts at 41. First, a disc exercise timer is checked at 42 to detect whether disc drive 10 has been exercised enough to warrant servicing the heads by removing excess lubricant from the head. If disc drive 10 has not yet been exercised enough (NO), then disc drive 10 is returned at 43 to normal use or exercise operation. If the accumulated disc exercise time has been reached or exceed the limit set for the disc exercise time interval (YES), then the program flow proceeds to TIMED STOP step 44. In other words, the process waits until a selected level of exercise time has accumulated before service is performed. In timed stop step 44, an increment of lubricant is removed by automatically leaving head 10 landed on a landing spot in the landing zone on the disc for a selected stop interval. The timed stop interval is long enough to transfer only a portion of accumulated lubricant to the landing spot, but not long enough to allow the head to stick so much that the drive motor can't break it free. After completion of step 44, TIMED RUN step 46 is performed. In TIMED RUN step 46, the heads are lifted by spinning the disc for a selected timed run interval. The length of the timed run interval is selected to be long enough to ensure that the disc is spinning freely. After completion of TIMED RUN step 46, COUNT step 44 is performed. In COUNT step 44, the number of fly/stop steps or sequences(44,46) that have been performed for the current service are counted by decrementing (or incrementing) a counter for each fly/stop sequence. When a desired, preset number of fly/stop sequences is completed, then the counter for fly/stops steps is reset and the disc drive is returned to normal operation at 50. If the preset number of fly/stop steps is not yet completed, then the process is repeated by going back to 44 to perform another fly/stop sequence. The flow of the process is automatic and proceeds until a preset number of landings have been made to reduce the amount of lubricant on the head to ensure it won't stick.

If desired, at step 42, a check can also be made to sense whether the disc drive has been put in a power saving mode. If the disc is not both in a power saving mode as well as having been exercised enough, then the disc drive can be returned to normal operation at 43 until both conditions have been met at 42.

Figure 5:
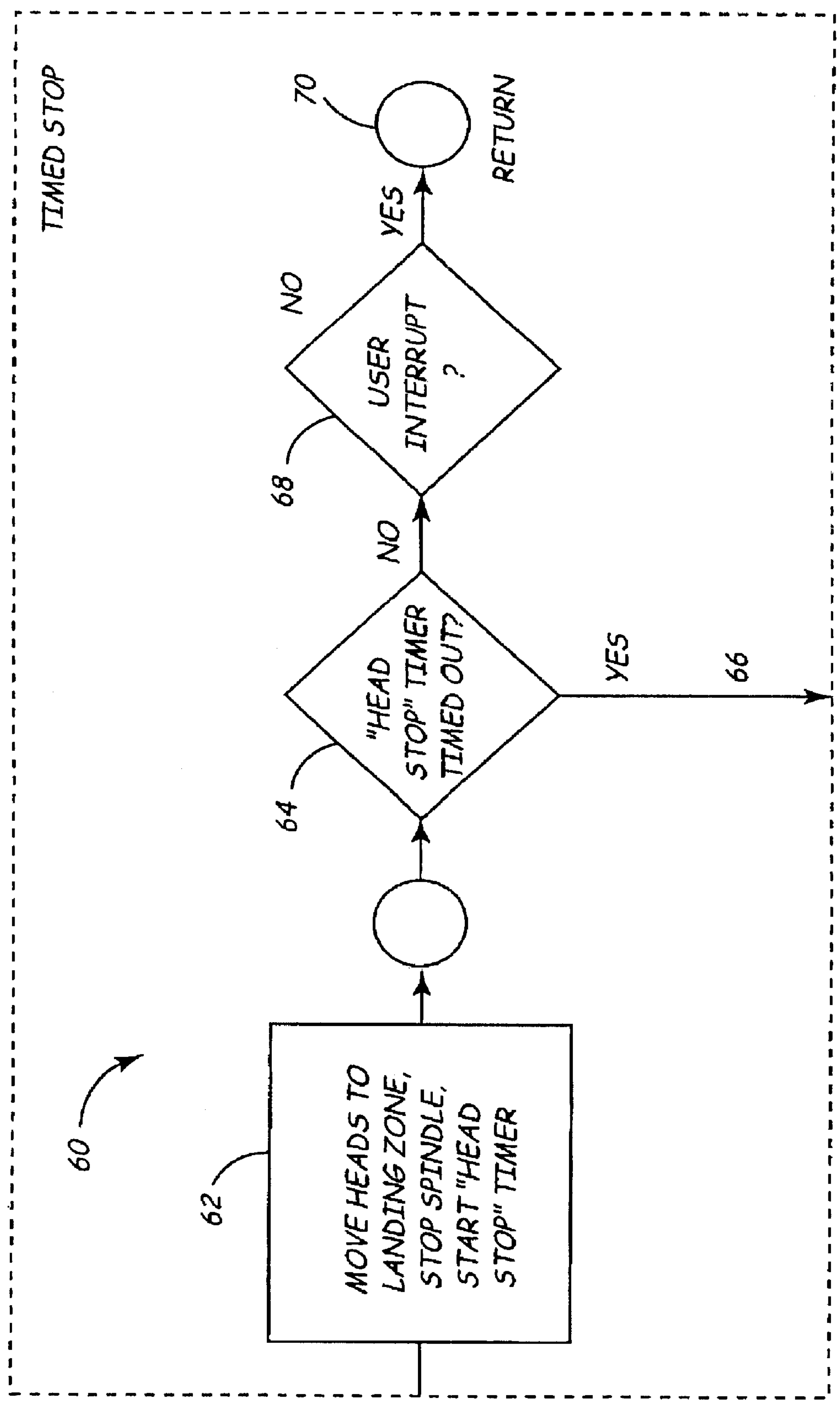
FIG. 5 is a flow chart of a process of leaving a head landed on a landing spot for a timed stop interval.
Figure 6:
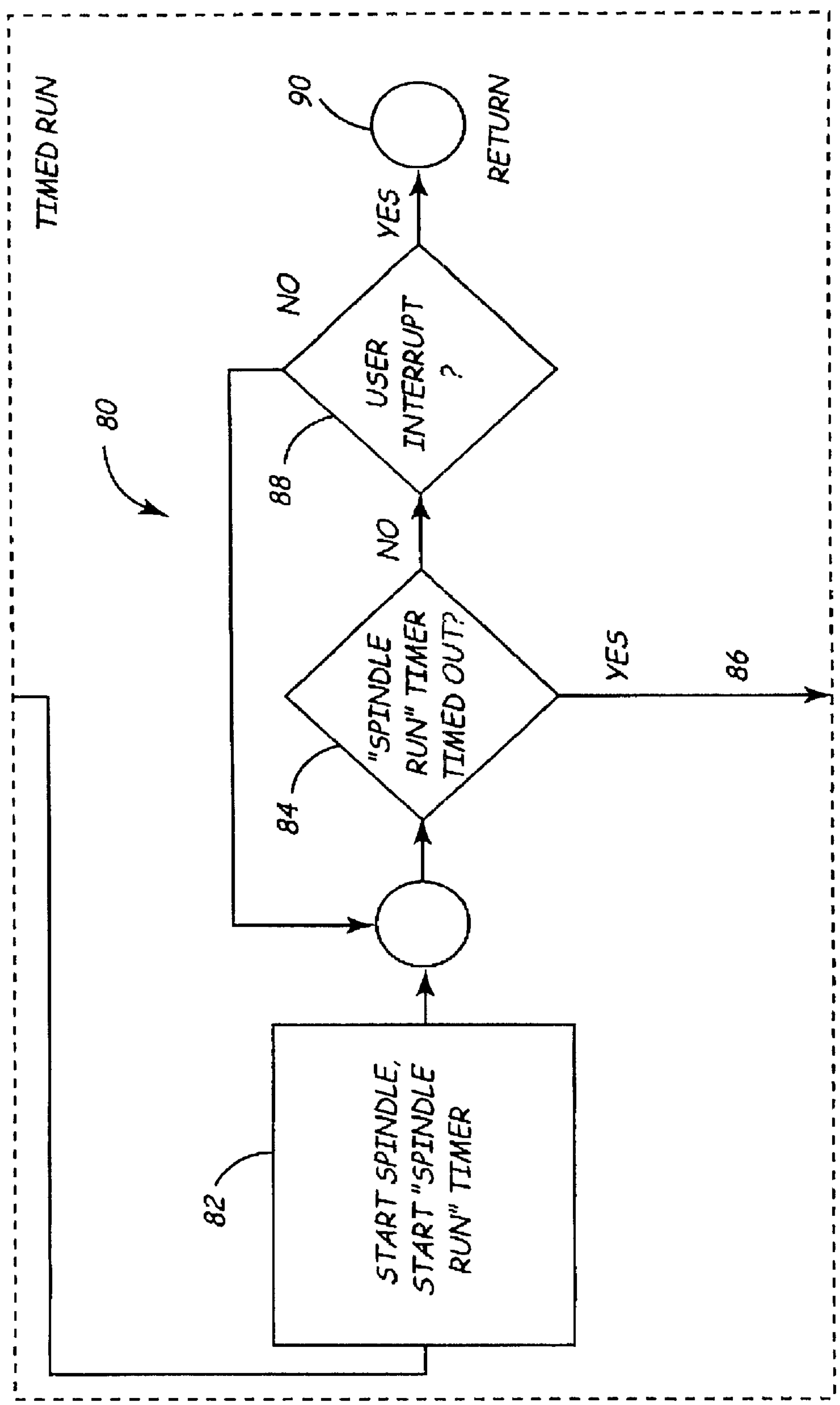
FIG. 6 is a flow chart of a process of lifting a head for a timed run interval.
Figure 7:
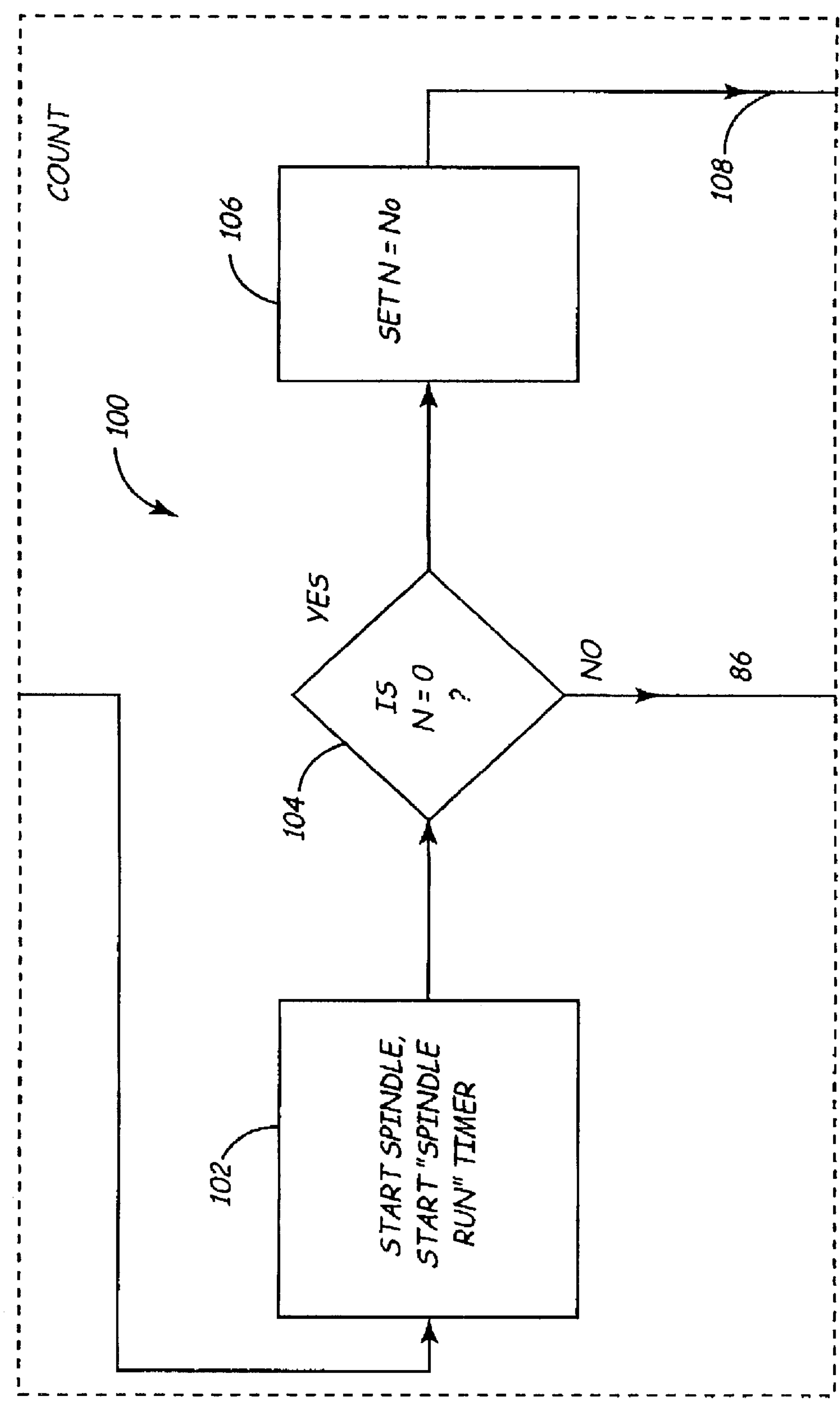
FIG. 7 is a flow chart of a process of controlling a number of stop and run intervals.

Examples of how steps 44, 46 and 48 of FIG. 4 can be performed are shown in more detail in FIGS. 5, 6 and 7. The steps shown in FIGS. 4, 5, 6 and 7 are all controlled automatically by electronic circuitry 24 in controller 22. Electronic circuitry 24 can comprise a microcontroller, programmed logic array or custom integrated circuit programmed to perform the desired logical steps, timing and control functions.

In FIG. 5, control sequence 60 is shown for performing a TIMED STOP process. At step 62, the heads are moved to the landing zone, the spindle is stopped and a HEAD STOP timer is started. Next, at step 64, the HEAD STOP timer is tested to find out if it is timed out or complete. If the HEAD STOP time interval is completed (YES), then program flow moves on at 66 to TIMED RUN (FIG. 6). If the HEAD STOP time is not complete (NO), however, a step 68 is then made to find out whether there is a user interrupt. If there is a user interrupt (YES), then the disc drive is returned (70) to normal operation without completing the service process. If there is no user interrupt (NO), however, the process continues back to step 64. In other words, the process loops back until either the HEAD STOP time has elapsed or until there is a user interrupt. After the interrupt is handled, control can be returned (at 41 in FIG. 4) to complete the service process.

In FIG. 6, control sequence 80 is shown for performing a TIMED RUN process. At step 82, the spindle is started and a SPINDLE RUN timer is started. Next, at step 84, the SPINDLE RUN timer is tested to find out if it is timed out or complete. If the SPINDLE RUN time interval is completed (YES), then program flow moves on at 86 to a COUNT step (FIG. 7). If the SPINDLE RUN time is not complete (NO), however, a step 88 is then made to find out whether there is a user interrupt. If there is a user interrupt (YES), then the disc drive is returned (90) to normal operation without completing the service process. If there is no user interrupt (NO), however, the process continues back to step 84. In other words, the process loops back until either the SPINDLE RUN time has elapsed or until there is a user interrupt. After the interrupt is handled, control can be returned (at 41 in FIG. 4) to complete the service process.

In FIG. 7, count control process 100 is shown. After completing each fly/stop sequence, the sequence is counted by decrementing a counter at step 102. Next, the counter is tested to see if it has been counted down to zero at step 104. If the counter has reached zero (YES), then the desired number of TIMED RUN and TIMED STOP sequences had been completed, the counter is set back to its starting setting at 106 and then the disc drive returns to normal operation at 108. If the desired number of repetitions of TIMED RUN and TIMED STOP is not complete yet (NO), then the process continues on at 110 to loop back to an additional fly/stop sequences (FIG. 4).

Figure 8:
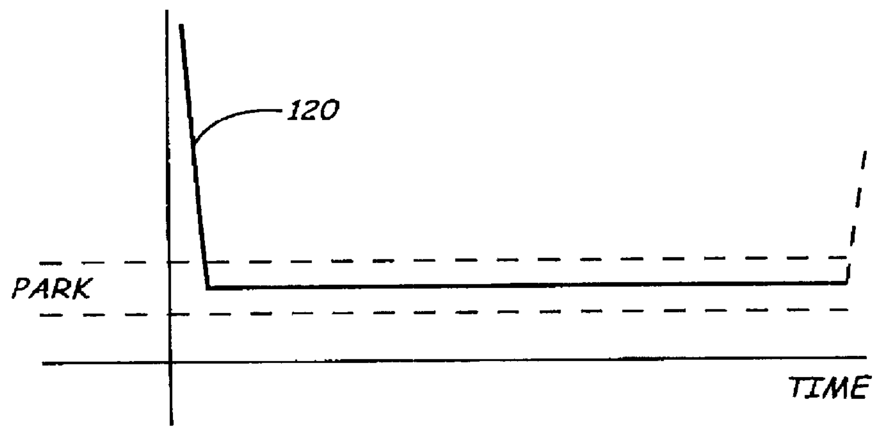
FIG. 8 is a timing diagram of head position and spindle drive actuations as a function of time.
Figure 8:
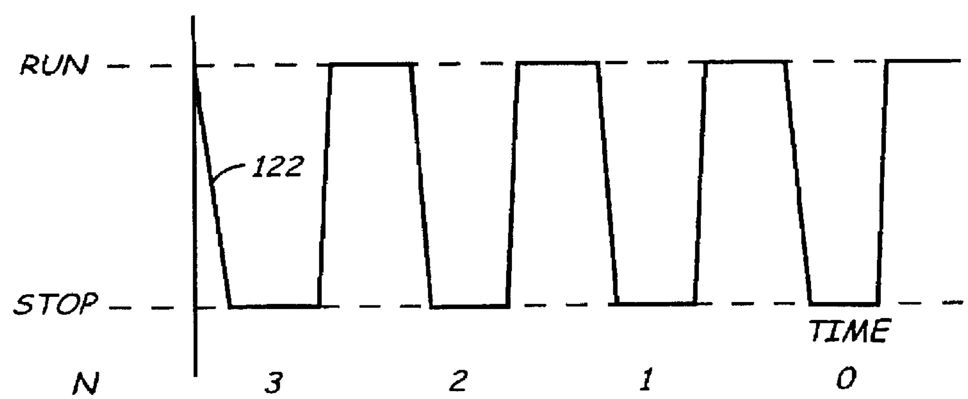

In FIG. 8, a timing diagram of the head position 120 and the spindle drive actuation 122 is illustrated. With the head stopped in the park or landing zone, the spindle drive is alternated between run and stop (fly/stop sequences) as shown in FIG. 8 until the counter is counted down to N=0.

The lengths of various time interval settings and number of repetitions to be performed are dependent on factors associated with the lubricant selected and the design of the disc drive. The factors are set experimentally based on testing and then stored at the disc drive level. The factors can be stored in disc drive circuitry, or alternately, the disc drive circuitry can access such data stored on the disc itself. The arrangement allows for relatively transparent and automatic maintenance of a disc drive without having to rely on the user or service personnel to maintain the disc drive.

In one arrangement, the algorithm of the present invention may be executed after approximately three weeks of drive operation. Further, in one preferred embodiment, less than about 10 to about 20 percent of the air bearing surface of the slider is allowed to be flooded with lubricant before reinitiating flying. It has been found that if more than about 10 to about 20 percent of the air bearing surface is covered with lubricant, the motor may not be capable of breaking the initial stiction. In one arrangement, about 10 percent of the air bearing surface was found to be flooded with lubricant after between about 10 to 14 minutes.

Figure 9:
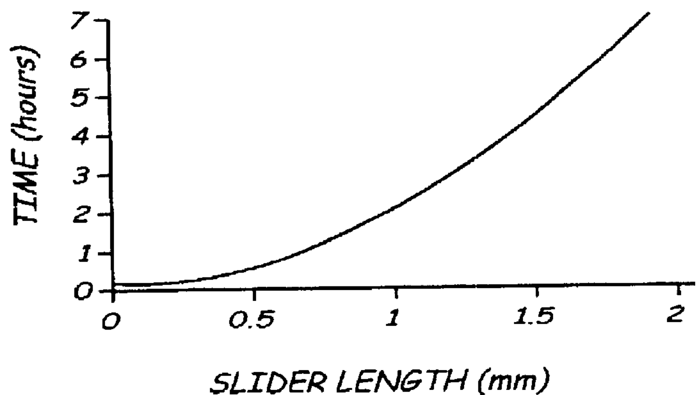
FIG. 9 is a graph of time in hours versus slider length in millimeters.
Figure 10:
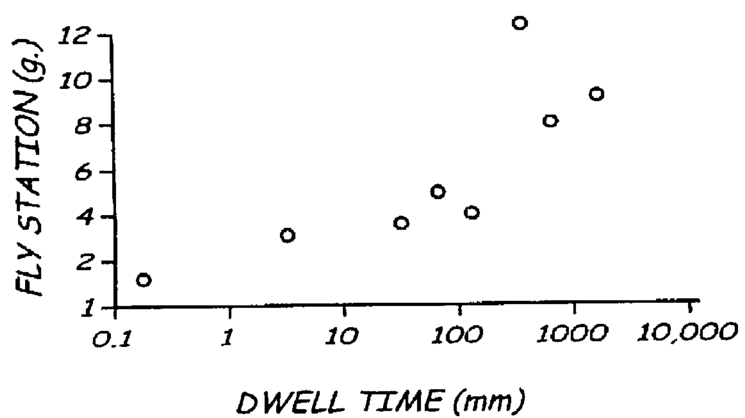
FIG. 10 is a graph of fly/stiction in grams versus dwell time in minutes.

A number of factors effect the distribution of lubricant across the air bearing surface. Lubrication collection on the head takes place due to the migration of lubricant from air bearing stagnation regions to the air bearing surface by a capillary action. A useful formula determines the time necessary for an air bearing with a fully flooded surface to engulf the total surface. The air bearing surface and the media surface form a capillary channel spaced apart by the combined head/medium roughness. If one assumes that the lubricant collects at the stagnation regions of the slider, as well as along the trailing edges of the slider, one can derive a formula to describe the time required for the lubricant to fill the entire length (L) of the slider in a one dimensional model:

$$t=3\eta L^2/(h\gamma) \qquad \text{EQUATION 1}$$

Where $\eta$ is the lubricant viscosity, $\gamma$ is the surface tension of the lubricant, h is the capillary spacing determined by peak roughness, and L is the length of the slider. FIG. 9 is a graph showing the time for a droplet of lubricant collected at the trailing edge of a slider to wick into the interface versus slider length in millimeters. FIG. 9 was generated using Equation 1 in which $\eta$ was 10 poise, $\gamma$ was 20 dyne/cm, h was 20 nm and L ranged from zero to 2 mm. Thus, within the first two hours, over half of the slider surface has been flooded with liquid. FIG. 10 is a graph of fly/stiction in grams versus dwell time in minutes. These graphs illustrate that it takes a relatively large amount of time for liquid collected by the head to transfer into the interface. It is this effect that allows the present invention to release collected lubricant by "briefly" landing on the disc surface.

In considering the periods used in the present invention, there is a tradeoff which must be recognized between repeated takeoffs and landings versus the benefits of the reduced stiction. However, in typical embodiments, the number of additional contact start/stops required by the present invention will not exceed several hundreds of contact start/stops during the lifetime of the disc drive.

Although the present invention has been described with reference to preferred embodiments, workers skilled in the art will recognize that changes may be made in form and detail without departing from the spirit and scope of the invention.

What is claimed is:

1. A method of reducing sticking between a disc and a head of a disc drive due to lubricant accumulation, the method comprising:

waiting a selected accumulated disc exercise time interval;

incrementally removing the lubricant by automatically having the head stopped on a surface of the disc for a selected stop interval and lifting the head by spinning the disc for a selected run interval; and resetting the accumulated disc exercise time interval.

2. The method of claim 1 further comprising:

setting the selected stop interval to less than the time needed for the head to stick to the disc due to lubricant accumulation.

3. The method of claim 1 further comprising:

interrupting the step of incrementally removing lubricant responsive to a signal indicating a user request for disc service; and allowing service of the user request.

4. The method of claim 3 further comprising:

completing the step of incrementally removing lubricant after the user request has been serviced.

5. The method of claim 1 further comprising:

waiting until the disc drive is in a power saving mode before starting the incrementally removing step.

6. The method of claim 1 further comprising:

storing data representing the disc exercise time interval and the selected stop time interval in storage at the disc drive level.

7. The method of claim 1 wherein the surface of the disc comprises a landing zone.

8. The method of claim 1 wherein the stop interval is of sufficient duration to allow transfer of lubricant from a stagnant region of the head to an air bearing surface of the head.

9. The method of claim 8 wherein less than about 20 percent of the air bearing surface is covered by the lubricant after the stop interval.

10. A disc drive, comprising:

a disc having a disc surface with a lubricant carried thereon;

a drive motor coupled to the disc for spinning it;

a head positionable over the disc surface from which it accumulates lubricant during operation, the head being subject to sticking to the disc due to lubricant accumulation;

a head positioner, coupled to the head to selectively position the head over the disc surface; and a disc controller coupled to control the drive motor and the head positioner, alternately having the head stopped on the disc surface for a selected stop interval to remove an increment of lubricant from the head and then automatically lifting the head by spinning the disc for a selected run interval after the stop interval.

11. The disc drive of claim 10 wherein the disc controller automatically waits for an accumulated disc exercise time interval before alternately landing and lifting the head.

12. The disc drive of claim 10 wherein the stop interval is less than the time needed for the head to stick to the disc.

13. The disc drive of claim 10 wherein the disc controller has an input for receiving a user request for disc service, the controller responding by interrupting the alternate landing and lifting of the head to service the received user request.

14. The disc drive of claim 13 wherein the disc controller completes the interrupted alternate landing and lifting of the head after the user request is serviced.

15. The disc drive of claim 14 wherein the disc controller has a power saving mode and waits until the power saving mode is active before alternately landing and lifting the head to remove lubricant.

16. The disc drive of claim 10 wherein the disc drive stores data representing the selected stop interval and the disc exercise time interval.

17. The disc drive of claim 10 wherein the disc includes a landing zone and the controller lands the head on the landing zone during the stop interval.

18. The disc drive of claim 10 wherein the stop interval is of sufficient duration to allow transfer of lubricant from a stagnant region of the head to an air bearing surface of the head.

19. The disc drive of claim 18 wherein less than about 20 percent of the air bearing surface is covered by the lubricant after the stop interval.

20. A disc drive, comprising:

means for reading and writing data on a disc; and means for incrementally removing lubricant buildup on a slider of the means for reading and writing, including drive control circuitry providing the slider with a selected number of stop intervals and run intervals.

* * * * *